United States Patent
Honig et al.

(10) Patent No.: US 9,221,395 B2
(45) Date of Patent: Dec. 29, 2015

(54) SYSTEM AND METHOD OF MONITORING WHEEL END SEAL ASSEMBLY WEAR

(71) Applicant: ArvinMeritor Technology, LLC, Troy, MI (US)

(72) Inventors: Jonathan L. Honig, Bloomfield, MI (US); Nicholas S. Lakin, Rochester Hills, MI (US); Ken Flory, Commerce Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 81 days.

(21) Appl. No.: 14/160,012

(22) Filed: Jan. 21, 2014

(65) Prior Publication Data

US 2015/0203032 A1 Jul. 23, 2015

(51) Int. Cl.

| | |
|---|---|
| *B60Q 1/00* | (2006.01) |
| *B60Q 11/00* | (2006.01) |
| *G01P 1/02* | (2006.01) |
| *B60B 27/02* | (2006.01) |
| *B60B 27/00* | (2006.01) |
| *G01P 3/44* | (2006.01) |
| *B60C 23/00* | (2006.01) |
| *B60C 23/04* | (2006.01) |
| *F16J 15/32* | (2006.01) |

(52) U.S. Cl.
CPC ............... *B60Q 11/00* (2013.01); *B60B 27/00* (2013.01); *B60B 27/001* (2013.01); *B60B 27/02* (2013.01); *B60C 23/003* (2013.01); *B60C 23/0488* (2013.01); *F16J 15/3296* (2013.01); *G01P 1/026* (2013.01); *G01P 3/443* (2013.01); *F16C 2326/02* (2013.01)

(58) Field of Classification Search
CPC ...... G01P 1/026; G01P 3/443; F16C 2326/02; B60B 27/02; B60B 27/001
USPC ............. 340/441; 152/417; 301/108.1, 108.4; 384/448, 544
See application file for complete search history.

(56) References Cited

U.S. PATENT DOCUMENTS

| | | | |
|---|---|---|---|
| 6,244,316 B1 * | 6/2001 | Naedler | 152/417 |
| 6,983,999 B2 * | 1/2006 | Goettker | 301/108.4 |
| 6,994,136 B2 | 2/2006 | Stanczak | |
| 7,108,427 B2 * | 9/2006 | Joki et al. | 384/448 |
| RE41,756 E | 9/2010 | Claussen et al. | |
| 7,931,061 B2 | 4/2011 | Gonska et al. | |

(Continued)

FOREIGN PATENT DOCUMENTS

| | | |
|---|---|---|
| JP | 2009056948 A | 3/2009 |
| WO | 2014082692 A1 | 6/2014 |

OTHER PUBLICATIONS

MERITOR an ArvinMeritor brand, Mentor Tire Inflation System (MTIS) by PSI (TM), including Mentor ThermALERT (TM), PB-9999, revised May 2007.

(Continued)

*Primary Examiner* — John A Tweel, Jr.
(74) *Attorney, Agent, or Firm* — Brooks Kushman P.C.

(57) ABSTRACT

A system and method of determining wear of a wheel seal assembly. A warning indicative of wear of the wheel seal assembly may be generated when a wheel speed exceeds a threshold wheel speed for first amount of time, when a tire pressure exceeds a threshold tire pressure for a second amount of time, and/or when a wheel end temperature exceeds a threshold wheel end temperature for a third amount of time.

20 Claims, 3 Drawing Sheets

(56) References Cited

U.S. PATENT DOCUMENTS

| | | | |
|---|---|---|---|
| 8,267,591 B2* | 9/2012 | Baba et al. | 384/486 |
| 2012/0186714 A1 | 7/2012 | Richardson | |
| 2012/0234447 A1 | 9/2012 | Narloch et al. | |
| 2013/0139890 A1* | 6/2013 | Erb et al. | 137/1 |
| 2013/0140777 A1* | 6/2013 | Erb et al. | 277/578 |
| 2015/0055903 A1* | 2/2015 | Mock et al. | 384/448 |

OTHER PUBLICATIONS

European Patent Office, European Search Report for the corresponding European Patent Application No. EP 14 18 7681 mailed Jul. 30, 2015.

* cited by examiner

SYSTEM AND METHOD OF MONITORING WHEEL END SEAL ASSEMBLY WEAR

TECHNICAL FIELD

This patent application relates to a system and method of monitoring wear of a wheel seal assembly that may be associated with a tire inflation system.

BACKGROUND

A tire inflation system with an integrated wheel seal is disclosed in U.S. Pat. No. 7,931,061.

SUMMARY

In at least one embodiment, a method of determining wear of a wheel seal assembly is provided. The method may include generating a warning indicative of wear of the wheel seal assembly when a wheel speed exceeds a threshold wheel speed for a first amount of time, when a tire pressure exceeds a threshold tire pressure for a second amount of time, and/or when a wheel end temperature exceeds a threshold wheel end temperature for a third amount of time.

In at least one embodiment, a system for determining wear of a wheel seal assembly is provided. The system may include a hub that may be rotatably disposed on a spindle and a wheel speed sensor that may provide data indicative of rotation of the hub to a control module. The wheel seal assembly may be disposed proximate the spindle and the hub and may include a seal passage that may route pressurized gas to a tire that is supported by the hub. The control module may generate a warning indicative of wear of the wheel seal assembly when the wheel speed exceeds a threshold wheel speed for a first amount of time.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
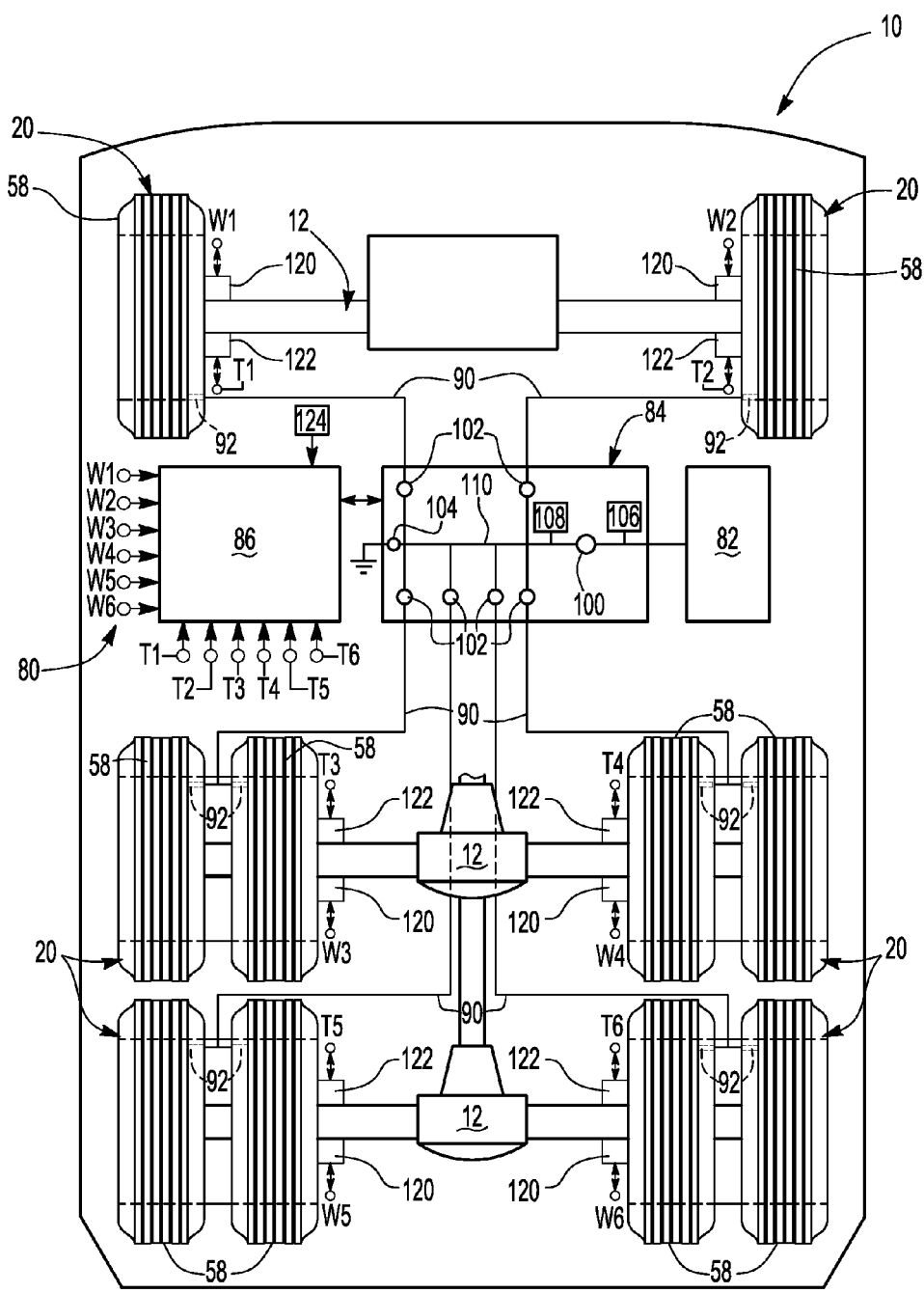
FIG. 1 is a schematic of an exemplary vehicle having a tire inflation system.

Referring to FIG. 1, an exemplary vehicle 10 is shown. The vehicle 10 may be of any suitable type, such as a motor vehicle like a truck, bus, farm equipment, military transport or weaponry vehicle, cargo loading equipment for land, air, or marine vessels, or a trailer that may be provided with a motor vehicle.

Figure 2:
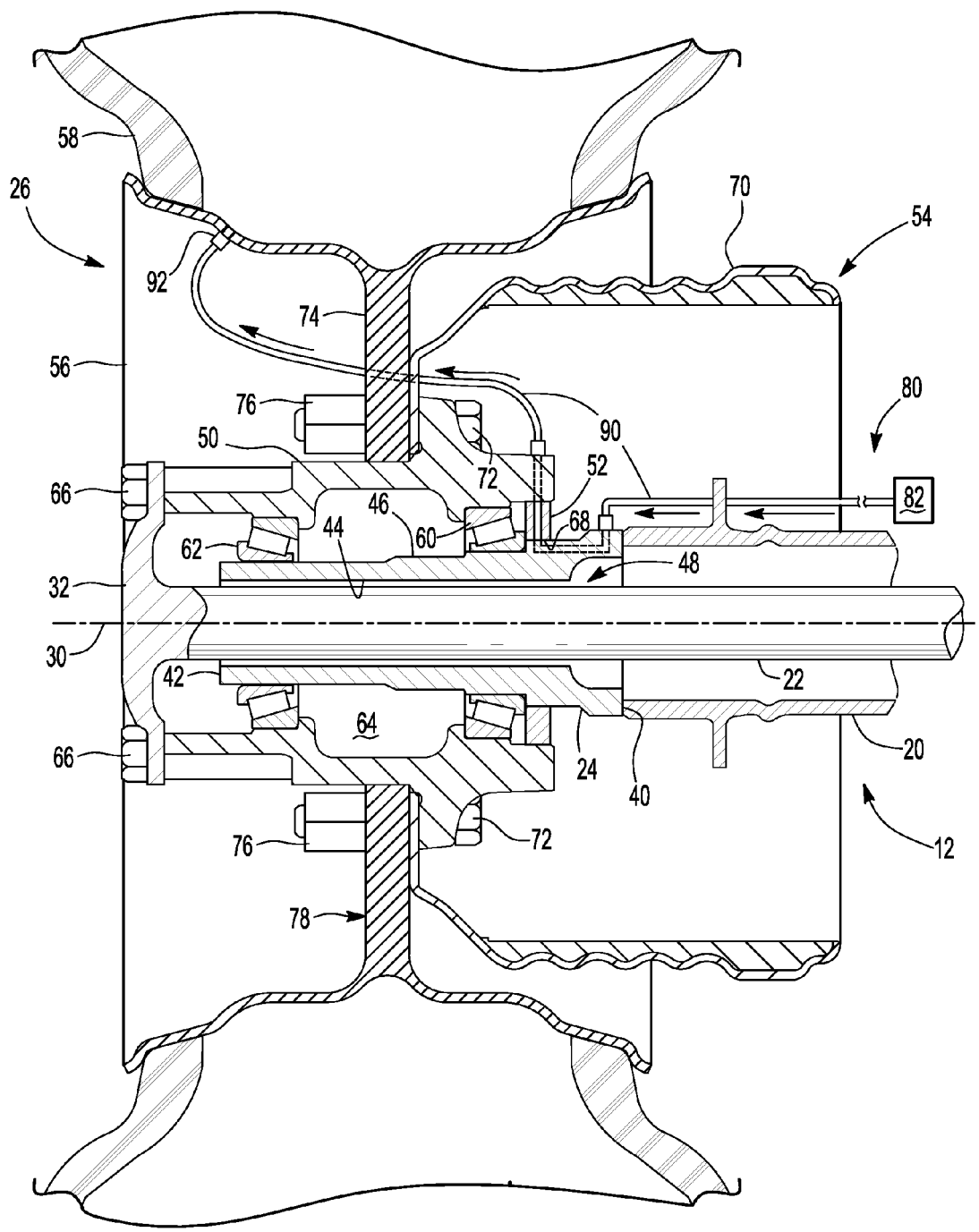
FIG. 2 is a section view of an exemplary wheel end assembly having a wheel seal assembly that may be provided with the vehicle.

The vehicle 10 may include a plurality of axles or axle assemblies 12 that may support and facilitate rotation of at least one wheel. An axle assembly 12 may or may not be configured to steer the vehicle 10. In addition, an axle assembly 12 may or may not be configured as a drive axle that may provide torque to at least one associated wheel. In a drive axle configuration such as is shown in FIG. 2, the axle assembly 12 may include an axle housing 20, an axle shaft 22, a spindle 24, and a wheel end assembly 26.

The axle housing 20 may receive various components of the axle assembly 12. In addition, the axle housing 20 may facilitate mounting of the axle assembly 12 to the vehicle 10. The axle housing 20 may define a cavity that may receive at least a portion of the axle shaft 22.

The axle shaft 22 may provide torque to the wheel end assembly 26 to propel the vehicle. For instance, the axle shaft 22 may be connected at a first end to a vehicle drivetrain component, like a differential or input shaft, and may be coupled to the wheel end assembly 26 at a second end. In at least one embodiment, the axle shaft 22 may extend along and may rotate about an axis 30. Alternatively, the axle shaft 22 may be configured for use with an independent suspension system and may have multiple shaft segments and/or joints, such as constant-velocity joints, that may facilitate relative movement between the first end and the wheel end assembly 26. The axle shaft 22 may include an axle flange 32 disposed at a distal end. The axle flange 32 may facilitate mounting of the wheel end assembly 26 to the axle shaft 22. In a non-drive axle configuration, the axle shaft 22 may be omitted.

The spindle 24 may be provided with or may be fixedly positioned with respect to the axle assembly 12. The spindle 24 may generally extend along but may not rotate about the axis 30. In a drive axle configuration, the spindle 24 may include a first end surface 40, a second end surface 42, an internal surface 44, an external surface 46, and a hole 48. In a non-drive axle configuration, the internal surface 44 and the hole 48 may be omitted. Moreover, in a steerable non-drive axle configuration, the spindle 24 may be provided with or may be fixedly positioned with respect to a steering knuckle rather than the axle housing 20. The first end surface 40 may be disposed proximate or may engage the axle housing 20. The second end surface 42 may be disposed opposite the first end surface 40 and may be located near the axle flange 32. The internal surface 44 may extend between the first end surface 40 and the second end surface 42 and may at least partially define the hole 48 through which the axle shaft 22 may extend. As such, the spindle 24 may be spaced apart from the axle shaft 22 to permit the axle shaft 22 to rotate about the axis 30. The external surface 46 may be disposed opposite the internal surface 44. The external surface 46 of the spindle 24 may support one or more wheel bearings that may rotatably support the wheel end assembly 26 as will be discussed in more detail below.

The wheel end assembly 26 may be rotatably coupled to the axle shaft 22. The wheel end assembly 26 may include a hub 50, a wheel seal assembly 52, a brake subsystem 54, a wheel 56, and a tire 58.

The hub 50 may be rotatably disposed on the spindle 24. For instance, one or more wheel bearings may be mounted on the spindle 24 and may rotatably support the hub 50. In FIG. 2, a first wheel bearing 60 and a second wheel bearing 62 are provided in a cavity 64 that is located between the spindle 24 and the hub 50. The first wheel bearing 60 may be disposed inboard or further from the second end surface 42 than the second wheel bearing 62. As such, the hub 50 may be configured to rotate about the axis 30. In a drive axle configuration, the axle flange 32 may be coupled to the hub 50 with one or more fasteners 66. As such, the hub 50 may rotate with the axle shaft 22. In a non-drive axle configuration, the hub 50 may not be coupled to an axle shaft 22 or axle flange 32.

The wheel seal assembly 52, which may also be called a wheel seal or wheel end seal assembly, may be disposed between the spindle 24 and the hub 50. The wheel seal assembly 52 may inhibit contaminants from entering the cavity 64 and may help retain lubricant in the cavity 64. The wheel seal assembly 52 may have a sealing surface 68 that may engage or seal against another component that may move or rotate with respect to the wheel seal assembly 52. In at least one embodiment, the wheel seal assembly 52 may be fixedly disposed with respect to the hub 50 and may rotate about the axis 30 and with respect to the spindle 24. In such a configuration, the sealing surface 68 may engage and seal against the external surface 46 of the spindle 24. Alternatively, the wheel seal assembly 52 may be fixedly disposed with respect to the spindle 24 and the hub 50 may rotate about the axis 30 with respect to the wheel seal assembly 52. In such a configuration, the sealing surface 68 may engage and seal against the hub 50.

The brake subsystem 54 may be adapted to slow or inhibit rotation of at least one associated wheel 56. For example, the brake subsystem 54 may be configured as a friction brake, such as a drum brake or a disc brake. In FIG. 2, a portion of the brake subsystem 54 is shown with a drum brake configuration. In a drum brake configuration, a brake drum 70 may be fixedly disposed on the hub 50 with one or more fasteners 72, such as wheel lug studs. The brake drum 70 may extend continuously around brake shoe assemblies (not shown) that may be configured to engage the brake drum 70 to slow rotation of an associated wheel 56.

The wheel 56 may be fixedly disposed on the hub 50. For example, the wheel 56 may be mounted on the hub 50 via the fasteners 72. More specifically, the wheel 56 may have a wheel mounting flange 74 that may have a set of holes that may each receive a fastener 72. A lug nut 76 may be threaded onto each fastener to secure the wheel 56 to the fasteners 72 and the hub 50. The lug nut 76 may engage or may be disposed proximate an outboard side 78 of the wheel mounting flange 74 that faces way from the brake drum 70 or toward the axle flange 32. The wheel 56 may be configured to support the tire 58. The tire 58 may be a pneumatic tire that may be inflated with a pressurized gas or pressurized gas mixture.

Referring to FIGS. 1 and 2, the vehicle 10 may include a tire inflation system 80. The tire inflation system 80 may be associated with the wheel end assembly 26. The tire inflation system 80 may be disposed on the vehicle 10 and may be configured to provide a pressurized gas or pressurized gas mixture to one or more tires 58. For clarity, the term "pressurized gas" may refer to either a pressurized gas or a pressurized gas mixture. The tire inflation system 80 may include a pressurized gas source 82 and a gas supply subsystem 84. In addition, the tire inflation system 80 may include or may be controlled by a controller or control system 86.

The pressurized gas source 82 may be configured to supply or store a volume of a pressurized gas or pressurized gas mixture, like air or nitrogen. For example, the pressurized gas source 82 may be a tank and/or a pump like a compressor. The pressurized gas source 82 may be disposed on the vehicle 10 and may provide a pressurized gas or pressurized gas mixture at a pressure that is greater than or equal to a desired inflation pressure of a tire 58. As such, the pressurized gas source 82 may inflate a tire 58 or maintain a desired tire pressure.

The gas supply subsystem 84 may fluidly connect the pressurized gas source 82 to one or more tires 58. The gas supply subsystem 84 may include one or more conduits 90, such as a hose, tubing, pipe, or combinations thereof, which may provide pressurized gas to at least one tire 58. For instance, in FIG. 1 a first conduit 90 may route pressurized gas from the pressurized gas source 82 to a passage in the spindle 24 and to the wheel seal assembly 52 while a second conduit 90 may route pressurized gas from the wheel seal assembly 52 or a passage in the hub 50 to the tire 58. In addition, one or more tire valves 92 may be associated with or provided with a conduit 90 to enable or disable the flow of the pressurized gas to or from a tire 58. The flow of pressurized gas during tire inflation is represented by the arrows in the conduit 90 in FIG. 2. The routing of the conduits 90 between the pressurized gas source 82 and a tire 58 is exemplary and is not meant to be limiting as other conduit routing paths may be provided. For instance, a single conduit 90 may be associated with each tire 58 rather than multiple tires as is shown in the bottom half of FIG. 1.

The gas supply subsystem 84 may also various valves and/or pressure sensors that may facilitate control of the tire inflation system 80. For instance, the gas supply subsystem 84 may include an inlet valve 100, at least one outlet valve 102, an exhaust valve 104, a first pressure sensor 106, and a second pressure sensor 108.

The inlet valve 100 may enable or disable the flow of pressurized gas from an outlet of the pressurized gas source 82 to at least one outlet valve 102. Operation of the inlet valve 100 may be controlled by the control system 86. For instance, the inlet valve 100 may include or may be controlled by an actuator, such as solenoid, that may actuate the inlet valve 100 between an open position and a closed position. In the open position, pressurized gas may flow from the pressurized gas source 82 to a manifold 110. The manifold 110 may distribute pressurized gas to multiple conduits 90 and may be disposed between the inlet valve 100 and one or more outlet valves 102. In the closed position, pressurized gas may be inhibited from flowing from the pressurized gas source 82 to the manifold 110. In at least one embodiment, the inlet valve 100 may be normally closed under predetermined operating conditions, such as when the vehicle 10 is not operational or turned off or when the vehicle engine is not running. As such, the inlet valve 100 may inhibit depressurization of the pressurized gas source 82 in the event of a downstream leak.

The outlet valve 102 may enable or disable the flow of pressurized gas from the manifold 110 to a tire 58 or tire valve 92. In FIG. 1, six outlet valves 102 are shown, although it is contemplated that a greater or lesser number of outlet valves 102 may be provided. Each outlet valve 102 may be associated with a different tire 58 and a different conduit 90. Moreover, each outlet valve 102 may be actuated independently of the inlet valve 100 and independently of each other. As such, the inflation and pressure assessment of different tires 58 or sets of tires 58 may be independently controlled. Operation of the outlet valve 102 may be controlled by the control system 86. For instance, the outlet valve 102 may include or may be controlled by an actuator, such as solenoid, that may actuate the outlet valve 102 between an open position and a closed position. In the open position, pressurized gas may flow from the manifold 110 to at least one corresponding tire valve 92. In the closed position, pressurized gas may be inhibited from flowing from the manifold 110 to at least one corresponding tire valve 92. As such, pressurized gas may not be constantly provided to one or more tires 58, which may facilitate the use of pressure pulses to determine tire pressure as will be discussed in more detail below. In addition, the outlet valve 102 may allow a conduit 90 to be vented to the surrounding environment between the outlet valve 102 and a corresponding tire valve 92. In at least one embodiment, the outlet valve 102 may be normally closed under predetermined operating conditions, such as when the vehicle 10 is not operational or turned off or when the vehicle engine is not running.

One or more exhaust valves 104 may facilitate venting of pressurized gas from a tire 58 and an associated conduit 90 to the atmosphere or surrounding environment. In FIG. 1, one exhaust valve 104 is shown that is fluidly connected to the manifold 110, although it is contemplated that a greater number of exhaust valves 104 may be provided, such as by providing exhaust valves 104 that are associated with different tires 58 or different conduits 90. For example, such exhaust valves 104 may be provided between a tire 58 and an outlet valve 102 or between an outlet valve 102 and the manifold 110. In addition, the exhaust valve 104 or exhaust valve functionality may be provided with an outlet valve 102. Thus, the exhaust valve 104 may be part of the outlet valve 102 in one or more embodiments. The exhaust valve 104 may be actuated independently of the inlet valve 100 and/or an outlet valve 102. Moreover, in a configuration having multiple exhaust valves, the exhaust valves 104 may be actuated independently of each other. As such, the inflation, deflation and pressure assessment of different tires 58 or sets of tires 58 may be independently controlled.

The first pressure sensor 106 may be configured to detect the pressure of the pressurized gas provided by the pressurized gas source 82. The first pressure sensor 106 may be of any suitable type and may be fluidly connected to the pressurized gas source 82. For example, the first pressure sensor 106 may be fluidly connected to the pressurized gas source 82 between the pressurized gas source 82 and the inlet valve 100.

The second pressure sensor 108 may be configured to detect the pressure of the pressurized gas provided to a tire 58 or tire valve 92. The second pressure sensor 108 may be of any suitable type and may be disposed between the inlet valve 100 and the tire valve 92 and may be fluidly connected to the manifold 110. As such, the second pressure sensor 108 may be isolated from the pressurized gas source 82 by closing the inlet valve 100. In at least one embodiment, the second pressure sensor 108 may be disposed between the inlet valve 100 and one or more outlet valves 102 so that the second pressure sensor 108 may be used to detect the pressure of pressurized gas supplied to different tires 58. Alternatively, multiple second pressure sensors 108 may be provided that may detect the pressure supplied to a particular conduit 90 or particular tire 58.

Tire pressure may be checked or sampled in various ways depending on the configuration of the tire inflation system 80. For example, tire pressure may be directly detected or measured with a tire pressure sensor that may be disposed inside the tire or inside a tire chamber that may receive pressurized gas. Such a tire pressure sensor may wirelessly transmit tire pressure data to the control system 86. Tire pressure may also be checked by opening a tire valve 92 with a pulse of pressurized gas and then measuring the pressure upstream or in a supply conduit. For example, tire pressure may be detected or measured by actuating or opening a tire valve 92 with a pressurized gas pulse and detecting pressure of a feedback pulse or upstream pressure with the second pressure sensor 108.

An example of a sequence of steps for providing a pressure pulse is as follows. First, the inlet valve 100 and the outlet valve 102 may be opened to allow pressurized gas to flow from the pressurized gas source 82 to a tire 58. The exhaust valve 104 may be closed so that the pressurized gas is not exhausted to the atmosphere. The inlet valve 100 and the outlet valve 102 may open at approximately the same time. Alternatively, the outlet valve 102 may open before the inlet valve 100 to inhibit potential damage to the outlet valve 102 or other hardware. The inlet valve 100 and the outlet valve 102 may both remain open for a pressurized gas pulse duration time which may be a fixed or variable amount. Next, the inlet valve 100 may be closed when the current pressurized gas pulse duration time has elapsed to terminate the flow of pressurized gas from the pressurized gas source 82 to the tire 58 and thereby end the pressurized gas pulse. Then, a delay may be executed to allow the pressure between the inlet valve 100 and the tire valve 92 to stabilize to improve the accuracy of the pressure reading that may be obtained with the second pressure sensor 108. Next, the tire inflation pressure may be measured or detected with a sensor, such as the second pressure sensor 108. As such, the tire inflation pressure may be measured with a pressure sensor that is disposed outside of the tire 58 and may be measured before opening the exhaust valve 104 or while the exhaust valve 104 is closed.

The control system 86 may monitor and control operation of the tire inflation system 80. The control system 86 may include one or more electronic controllers or control modules that may monitor and/or control various components of the tire inflation system 80. For example, the control system 86 may be configured to control actuation of the inlet valve 100, the outlet valve 102, and the exhaust valve 104 to control the flow of pressurized gas. In addition, the control system 86 may be configured to receive data from the first pressure sensor 106 and the second pressure sensor 108 that may be indicative of pressure. In FIG. 1, communication between the control system 86 and these components is represented by the double arrowed line that is located adjacent to the control system 86.

The control system 86 may also process input signals or data from various input devices or sensors, such as wheel speed sensor 120, a wheel end temperature sensor 122, and an operator communication device 124.

A wheel speed sensor 120 may be provided to detect or provide data indicative of the rotation speed of a wheel 56. The wheel speed sensor 120 may be of any suitable type. For example, the wheel speed sensor 120 may be configured to detect the rotational speed of a wheel 56 or associated wheel axle. Data from the wheel speed sensor 120 may also be used to determine a distance of travel of the vehicle 10. For instance, the distance of travel may be based on tire size (e.g., tire diameter) and the rotational distance or number of revolutions detected by the wheel speed sensor 120. In at least one embodiment, a wheel speed sensor 120 may be associated with each wheel end assembly 26 or wheel axle, such as may be provided with an anti-lock brake system (ABS) or traction control system. As such, the wheel speed sensor 120 may also detect wheel slip or unexpected rotation of a wheel end assembly 26 in a manner known by those skilled in the art. Communication between the control system 86 and each wheel speed sensor 120 is represented by connection nodes W1 through W6 in FIG. 1.

The wheel end temperature sensor 122 may detect or provide data indicative of the temperature of one or more components that may be associated with a wheel end assembly 26. For instance, the wheel end temperature sensor 122 may detect or provide data indicative of a wheel end temperature proximate the wheel seal assembly 52.

The operator communication device 124 may be provided to receive an input from an operator or vehicle driver and/or provide information to an operator. The operator communication device 124 may be of any suitable type or types, such as a switch, button, sensor, display, touchscreen, keypad, voice command or speech recognition system, or the like. The operator communication device 124 may be used to input data that may not be predetermined or provided by a sensor or other input device, such as may be the case when a vehicle 10 is not equipped with one or more of the sensors discussed herein. In addition, the operator communication device 124 may be configured to provide information to the operator, such as a warning or alert that a wheel seal assembly 52 may be due for servicing or replacement. Information may be provided to an operator in one or more formats, such as an audible format, visual format, and/or haptic format.

Figure 3:
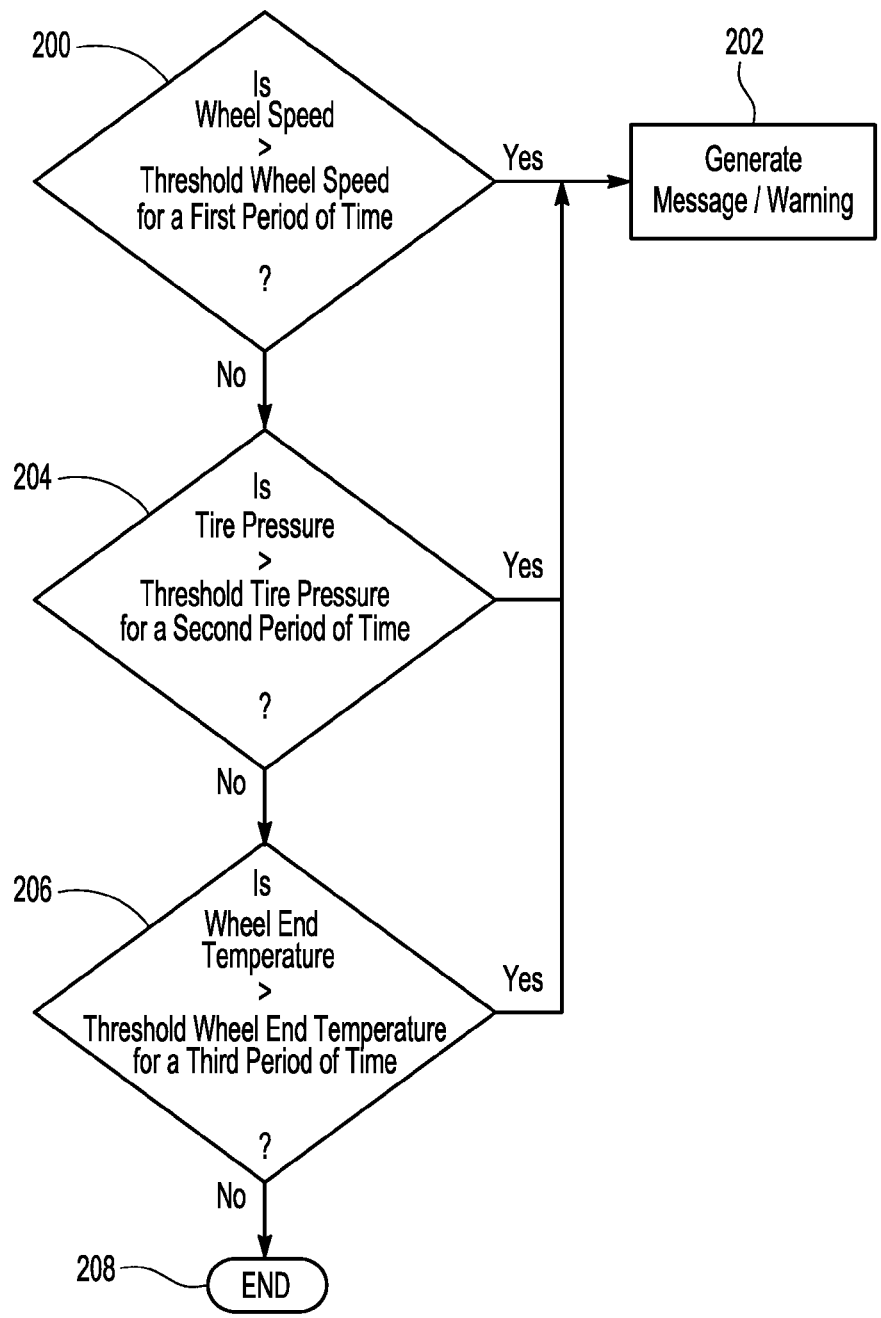
FIG. 3 is a flowchart of an exemplary method of monitoring wear of a wheel seal assembly.

Referring to FIG. 3, a flowchart of an exemplary method of monitoring wear of a wheel seal assembly that may be associated with a tire inflation system is shown. As will be appreciated by one of ordinary skill in the art, the flowchart may represent control logic that may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

In at least one embodiment, the method may be executed by the control system 86 and may be implemented as a closed loop control system. Moreover, the method may be enabled or disabled based on the operating state of the vehicle 10. For example, the method or control logic may be enabled when the vehicle ignition is turned on, when the engine is running, or when the vehicle is in motion in one or more embodiments. In addition, the method may be manually activated or deactivated.

As an overview, operation of the tire inflation system 80 may result in wear of the wheel seal assembly 52. For example, tire inflation system duty cycles (e.g., pressurization and depressurization cycles) and tire pressure checks that utilize pressure pulses may cause wear or degradation of an associated wheel seal assembly 52, such as sealing surface wear, which in turn may reduce seal integrity or sealing performance. For example, a pressurized gas pulse or inflation of a tire 58 may force a volume of pressurized gas through the wheel seal assembly 52, thereby increasing and subsequently decreasing the pressure inside the wheel seal assembly 52. The cumulative effect of multiple pressure pulses or tire inflation events in conjunction with the wear due to rotation of the wheel seal assembly 52 with respect to another component may degrade or reduce the life of a wheel seal assembly 52. Such wheel seal assembly wear may be exasperated in a system that checks tire pressure every vehicle ignition cycle (e.g., each time the vehicle is turned on). For instance, use of such a system in a vehicle that undergoes frequent stops and/or frequent vehicle ignition cycles (e.g., a delivery truck or cargo loading equipment) may result in frequent tire pressure checks, which may cause increase pressurization and wear in an associated wheel seal assembly 52, tire overinflation, and may increase the demand for pressurized gas from the pressurized gas source 82. Excessive wear may result in failure of a wheel seal assembly 52 to maintain a seal, which in turn may inhibit functionality of the tire inflation system 80. For instance, pressurized gas may escape to the surrounding environment through a failed or leaking wheel seal assembly 52 rather than be routed to inflate a corresponding tire 58. As such, a leaking wheel seal assembly 52 may impede tire inflation or determination of tire pressure based on pressure pulses.

Replacing a wheel seal assembly on a predetermined interval may overestimate or underestimate wear. As such, a wheel seal assembly may be replaced too early (e.g., when there is significant remaining seal life) or too late (e.g., after seal failure). The method described herein may allow a wheel seal assembly to be monitored or evaluated for potential wear on a seal-by-seal basis. As such, wheel seal assembly replacement or servicing may be tailored to an individual wheel seal assembly and/or changes in operational characteristics of the vehicle or vehicle environment.

The method will be primarily described in the context of evaluating the pressure of a single wheel seal assembly, but it is to be understood that the method may be applied to monitor or evaluate the condition of multiple wheel seal assemblies or sets of wheel seal assemblies.

The method may monitor or evaluate a wheel seal assembly based on wheel speed, tire pressure, wheel end temperature, or combinations thereof. FIG. 3 illustrates all three of these attributes, but it should be understood that one or more of these attributes may be omitted in various embodiments. Moreover, generating the warning when the wheel speed exceeds the threshold wheel speed for the first amount of time and the tire pressure exceeds the threshold tire pressure for the second amount of time.

At block 200, the method may determine whether the wheel speed is greater than a threshold wheel speed for a first period of time. Wheel seal assembly wear may increase as wheel speed increases and/or as the amount of time during which the sealing surface 68 of the wheel seal assembly is in engagement with a surface that rotates with respect to the sealing surface 68. Wheel speed may be based on data from a corresponding wheel speed sensor 120. The threshold wheel speed may be based on vehicle development testing and may be indicative of a wheel speed above which meaningful wear of a wheel seal assembly may occur. As one example, the threshold wheel speed may be about 5 mph (8 kph) and may be irrespective to the direction of rotation (e.g., the direction of rotation may be indicative of vehicle motion in a forward or backward direction). Data from a wheel speed sensor 120 may be obtained continuously or periodically, such as during a pressure pulse or tire pressure check. The total time during which the wheel speed exceeds the threshold wheel speed may be measured with a timer, clock, or counter (which may be collectively referred to as a timer herein) that may be associated with the control system 86. The timer may start when the wheel speed exceeds the threshold wheel speed and may stop when the wheel speed does not exceed the threshold wheel speed and/or when the vehicle is not operational (e.g., when the ignition is turned off). The total time may be cumulative. In other words, the total time may be measured by adding time periods measured with the timer together and storing the resultant sum in memory. The first period of time may be a predetermined or constant value that may be based on vehicle development testing and attributes, such as the configuration of the wheel seal assembly, configuration of the component against which a seal is made, and operating attributes of the vehicle and/or tire inflation system. If the wheel speed is greater than the threshold wheel speed for a cumulative amount of time that exceeds the first period of time, then the method may continue at block 202. If the wheel speed is not greater than the threshold wheel speed for a cumulative amount of time that exceeds the first period of time, then the method may continue at block 204.

At block 202, an alert, alarm, warning, or error message may be generated and may be provided to the driver. The alert, alarm, warning, or error message may be of any suitable type, such as an audible signal, visual signal, tactile (haptic) signal, or combinations thereof, and may identify a wheel seal assembly location and may warn the driver that the wheel seal assembly may have experienced sufficient wear to warrant servicing or replacement. As such, the alert, alarm, warning, or error message may be indicative of wear of the wheel seal assembly. In addition, the method may inhibit further seal wear by inhibiting additional tire pressure checks with pressure pulses or inflation of a tire that is associated with the wheel seal assembly. An override feature may be provided to allow a driver to continue to provide pressurized gas to a leaking tire. As such, the method may facilitate continued operation of the vehicle while informing an operator that a wheel seal assembly may require replacement. The override feature may be based on an input or signal from the operator communication device 124. Alternatively or in addition, the method may also attempt to proactively compensate for potential seal wear by adjusting the tire management and diagnostic strategy. Such compensation may include changing or adjusting the frequency of tire pressure checks (such as by reducing tire pressure check frequency or pressurization of a wheel seal assembly) and/or by updating expected pressure leak performance attributes.

At block 204, the method may determine whether the tire pressure is greater than a threshold tire pressure for a second period of time. Wheel seal assembly wear may increase as tire pressure increases and/or as the amount of time during which the wheel seal assembly is under pressure or pressurized with pressurized gas increases. Tire pressure may be based on data from a pressure sensor as previously discussed, such as a tire pressure sensor disposed inside a tire 58 or a pressure sensor associated with tire inflation system 80 like the second pressure sensor 108. Data from a pressure sensor associated with the tire inflation system 80 may be obtained during a pressure check, which may occur periodically (e.g., at vehicle start) or at predetermined or variable intervals. The total time during which the tire pressure exceeds the threshold tire pressure may be measured with a timer that may be associated with the control system 86 as previously discussed. The timer may start when the tire pressure exceeds the threshold tire pressure and may stop when the tire pressure does not exceed the threshold tire pressure and/or when the vehicle is not operational. The total time may be cumulative and may be measured by adding time periods measured with the timer together in storing the resultant sum in memory. The second period of time may differ from the first period of time discussed above. The second period of time may be a predetermined or constant value that may be based on vehicle development testing, and vehicle attributes, such as the configuration of the wheel seal assembly, configuration of the surface against which the seal engages, and operating attributes of the vehicle and/or tire inflation system. If the tire pressure is greater than the threshold tire pressure for an amount of time that exceeds the second period of time, then the method may continue at block 202. If the tire pressure is not greater than the threshold tire pressure for an amount of time that exceeds the second period of time, then the method may continue at block 206.

At block 206, the method may determine whether the wheel end temperature is greater than a threshold wheel end temperature for a third period of time. Wheel seal assembly wear may increase as wheel end temperature increases and/or as the amount of time during which the wheel seal assembly is at an elevated temperature increases. Wheel end temperature may be based on data from the wheel end temperature sensor 122 as previously discussed. The total time during which the wheel end temperature exceeds the threshold wheel end temperature may be measured with a timer that may be associated with the control system 86 as discussed above. The timer may start when the wheel end temperature exceeds the threshold wheel end temperature and may stop when the wheel end temperature does not exceed the threshold wheel end temperature and/or when the vehicle is not operational. The total time may be cumulative and may be measured by adding time periods measured with the timer together in storing the resultant sum in memory. The third period of time may differ from the first period of time and/or the second period of time that were previously discussed. The third period of time may be a predetermined or constant value that may be based on vehicle development testing, and vehicle attributes, such as the configuration of the wheel seal assembly, configuration of the surface against which the seal engages, and operating attributes of the vehicle and/or tire inflation system. If the wheel end temperature is greater than the threshold wheel end temperature for an amount of time that exceeds the third period of time, then the method may continue at block 202. If the wheel end temperature is not greater than the threshold wheel end temperature for an amount of time that exceeds the third period of time, then the method may end or complete an iteration at block 208. The method may repeat in a loop to continue monitoring or evaluating wear of the wheel seal assembly and/or may monitor or evaluate additional wheel seal assemblies in a similar manner.

The total or cumulative amount of time associated with wheel speed, tire pressure, and wheel end temperature may be reset when a wheel seal assembly is serviced or replaced. For example, total or cumulative amount of time during which the wheel speed exceeded the threshold wheel speed may be reset to zero after a wheel seal assembly is serviced or replaced. Likewise, the total or cumulative amount of time during which the tire pressure exceeded the threshold tire pressure and the total or cumulative amount of time during which the wheel end temperature exceeded the threshold wheel end temperature may also be reset to zero after a wheel seal assembly is serviced or replaced. As such, the life or condition of different wheel seal assemblies may be independently evaluated.

As previously mentioned, the method may monitor or evaluate a wheel seal assembly based on wheel speed, tire pressure, wheel end temperature, or combinations thereof. As such, a warning may be generated when the wheel speed exceeds the threshold wheel speed for the first amount of time, the tire pressure exceeds the threshold tire pressure for the second amount of time, when the wheel end temperature exceeds the threshold wheel end temperature for the third period of time, or combinations thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of determining wear of a wheel seal assembly, comprising:
    measuring an amount of time during which a wheel speed exceeds a threshold wheel speed; and generating a warning indicative of wear of the wheel seal assembly when the wheel speed exceeds the threshold wheel speed for a first amount of time.

2. The method of claim 1 wherein the wheel seal assembly engages a hub that rotates with respect to the wheel seal assembly and supports a wheel and a tire, and wherein the wheel seal assembly includes a seal passage that receives pressurized gas that is provided to inflate the tire.

3. The method of claim 1 further comprising:
measuring an amount of time during which a tire pressure exceeds a threshold tire pressure; and
generating the warning when the tire pressure exceeds the threshold tire pressure for a second amount of time.

4. The method of claim 1 further comprising measuring an amount of time during which a tire pressure exceeds a threshold tire pressure; and
generating the warning when the wheel speed exceeds the threshold wheel speed for the first amount of time and the tire pressure exceeds the threshold tire pressure for a second amount of time.

5. The method of claim 1 further comprising:
measuring an amount of time during which a wheel end temperature exceeds a threshold wheel end temperature; and
generating the warning when the wheel end temperature exceeds the threshold wheel end temperature for a third amount of time.

6. The method of claim 1 further comprising:
measuring an amount of time during which a wheel end temperature exceeds a threshold wheel end temperature; and
generating the warning when the wheel speed exceeds the threshold wheel speed for the first amount of time and the wheel end temperature exceeds the threshold wheel end temperature for a third amount of time.

7. The method of claim 1 further comprising:
measuring an amount of time during which a tire pressure exceeds a threshold tire pressure;
measuring an amount of time during which a wheel end temperature exceeds a threshold wheel end temperature; and
generating the warning when the wheel speed exceeds the threshold wheel speed for the first amount of time, or the tire pressure exceeds the threshold tire pressure for a second amount of time, or the wheel end temperature exceeds the threshold wheel end temperature for a third amount of time.

8. The method of claim 1 further comprising:
measuring an amount of time during which a tire pressure exceeds a threshold tire pressure;
measuring an amount of time during which a wheel end temperature exceeds a threshold wheel end temperature; and
generating the warning when the wheel speed exceeds the threshold wheel speed for the first amount of time, and the tire pressure exceeds the threshold tire pressure for a second amount of time, and the wheel end temperature exceeds the threshold wheel end temperature for a third amount of time.

9. A method of determining wear of a wheel seal assembly, comprising:
measuring an amount of time during which a tire pressure exceeds a threshold tire pressure; and
generating a warning indicative of wear of the wheel seal assembly when the tire pressure exceeds the threshold tire pressure for a second amount of time.

10. The method of claim 9 wherein the wheel seal assembly engages a hub that supports a wheel and a tire and that rotates with respect to the wheel seal assembly, and wherein the wheel seal assembly includes a seal passage that receives pressurized gas that is provided to inflate the tire.

11. The method of claim 9 further comprising:
measuring an amount of time during which a wheel end temperature exceeds a threshold wheel end temperature; and
generating the warning when the wheel end temperature exceeds the threshold wheel end temperature for a third amount of time.

12. The method of claim 9 further comprising:
measuring an amount of time during which a wheel end temperature exceeds a threshold wheel end temperature; and
generating the warning when the tire pressure exceeds the threshold tire pressure for the second amount of time and the wheel end temperature exceeds the threshold wheel end temperature for a third amount of time.

13. A system for determining wear of a wheel seal assembly, comprising:
a hub that is rotatably disposed on a spindle; and
a wheel speed sensor that provides data indicative of rotation of the hub to a control module;
wherein the wheel seal assembly is disposed proximate the spindle and the hub and includes a seal passage that routes pressurized gas to a tire that is supported by the hub; and
wherein the control module generates a warning indicative of wear of the wheel seal assembly when the wheel speed exceeds a threshold wheel speed for a first amount of time.

14. The system of claim 13 further comprising a pressure sensor that measures an inflation pressure of the tire, wherein the control module generates the warning when the inflation pressure exceeds a threshold tire pressure for a second amount of time.

15. The system of claim 14 further comprising a wheel end temperature sensor that provides data indicative of a wheel end temperature proximate the wheel seal assembly, wherein the warning is generated when the wheel end temperature exceeds a threshold wheel end temperature for a third amount of time.

16. The system of claim 13 further comprising a wheel end temperature sensor that provides data indicative of a wheel end temperature proximate the wheel seal assembly, wherein the warning is generated when the wheel end temperature exceeds a threshold wheel end temperature for a third amount of time.

17. The system of claim 13 wherein the tire is disposed on a wheel that is mounted to the hub.

18. The system of claim 13 wherein the wheel seal assembly extends between and engages the spindle and the hub.

19. The system of claim 13 wherein the hub rotates with respect to the wheel seal assembly and the wheel seal assembly has a sealing surface that engages the hub, wherein the warning is indicative of wear of the sealing surface.

20. The system of claim 13 wherein the wheel seal assembly rotates with respect to the spindle and the wheel seal assembly has a sealing surface that engages the spindle, wherein the warning is indicative of wear of the sealing surface.

* * * * *